United States Patent
Sun et al.

(10) Patent No.: US 10,152,930 B2
(45) Date of Patent: Dec. 11, 2018

(54) DRIVING METHOD FOR DISPLAY PANEL AND DRIVING DEVICE

(71) Applicant: Shenzhen China Star Optoelectronics Technology Co., Ltd., Shenzhen, Guangdong (CN)

(72) Inventors: Lei Sun, Guangdong (CN); Li-wei Chu, Guangdong (CN); Jianjun Xie, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 222 days.

(21) Appl. No.: 15/107,432

(22) PCT Filed: May 17, 2016

(86) PCT No.: PCT/CN2016/082298
§ 371 (c)(1),
(2) Date: Jun. 22, 2016

(87) PCT Pub. No.: WO2017/185429
PCT Pub. Date: Nov. 2, 2017

(65) Prior Publication Data
US 2018/0166028 A1    Jun. 14, 2018

(30) Foreign Application Priority Data
Apr. 25, 2016    (CN) .......................... 2016 1 0261162

(51) Int. Cl.
G09G 5/10    (2006.01)
G09G 3/36    (2006.01)
(Continued)

(52) U.S. Cl.
CPC ............. *G09G 3/3607* (2013.01); *G02F 1/13* (2013.01); *G09G 3/36* (2013.01); *G09G 3/3614* (2013.01);
(Continued)

(58) Field of Classification Search
CPC ... G09G 3/3614; G09G 3/3648; G09G 3/3688
See application file for complete search history.

(56) References Cited

U.S. PATENT DOCUMENTS 6,335,719 B1    1/2002  An et al.
8,232,950 B2    7/2012  Cha et al.
(Continued)

*Primary Examiner* — Nan-Ying Yang
(74) *Attorney, Agent, or Firm* — Andrew C. Cheng

(57) ABSTRACT

A driving method for a display panel and a driving device are disclosed. The method includes: detecting that if a current data frame satisfies a preset switching condition of switching a first polarity mode to a second polarity mode; if the current data frame satisfies a preset switching condition, obtaining a polarity input signal corresponding to a previous data frame; obtaining a data compensation value corresponding to each sub-pixel according to the polarity input signal and a position of each sub-pixel of the current data frame; under the second polarity mode, after superimposing a value of each sub-pixel of the current data frame and the data compensation value corresponding to each sub-pixel, outputting to a display panel. Accordingly, the present invention can avoid an instantaneous flicker when switching from the first polarity mode to the second polarity mode.

8 Claims, 3 Drawing Sheets

(51) Int. Cl.
*G06F 3/038* (2013.01)
*G09G 5/00* (2006.01)
*G02F 1/13* (2006.01)

(52) U.S. Cl.
CPC .............. *G09G 2320/0247* (2013.01); *G09G 2320/0295* (2013.01); *G09G 2320/08* (2013.01)

(56) References Cited

U.S. PATENT DOCUMENTS

| | | |
|---|---|---|
| 2001/0017607 A1 | 8/2001 | Kwon et al. |
| 2002/0067326 A1 | 6/2002 | Aoki |
| 2006/0007093 A1 | 1/2006 | La |
| 2006/0279506 A1 | 12/2006 | Choi |
| 2008/0170025 A1 | 7/2008 | Song et al. |
| 2008/0291189 A1 | 11/2008 | Song et al. |
| 2010/0231617 A1 | 9/2010 | Ueda et al. |
| 2011/0037760 A1* | 2/2011 | Kim ................ G09G 3/3614 345/214 |
| 2014/0267464 A1* | 9/2014 | Takamaru ........... G09G 3/3406 345/690 |

\* cited by examiner 2A                    2B

DRIVING METHOD FOR DISPLAY PANEL AND DRIVING DEVICE

BACKGROUND OF THE INVENTION

1. Field of the Invention

The present invention relates to a liquid crystal display field, and more particularly to a driving method for a display panel and a driving device.

2. Description of Related Art

In the conventional structure of a TFT-LCD display panel, a VAC technology is usually used to increase the transmittance degree and the viewing angle. However, when the display panel is in a low gray level, the VAC technology will cause an h-block problem.

In order to solve the h-block problem, changing the polarities of sub-pixels in the display panel is usually used to solve the above problem. However, in the moment when switching the polarity, because the sub-pixel having a same polarity in two continuous frames will be brighter than the sub-pixel having different polarities so as to generate an instantaneous flicker problem.

SUMMARY OF THE INVENTION

The main technology problem solved by the present invention is to provide a driving method for a display panel and a driving device, which is capable of solving the instantaneous flicker problem when switching the polarity in the conventional art.

In order to solve the above technology problem, a technology solution adopted by the present invention is: a driving method for a display panel, comprising: detecting that if a current data frame satisfies a preset switching condition of switching a first polarity mode to a second polarity mode; if the current data frame satisfies a preset switching condition, obtaining a polarity input signal corresponding to a previous data frame; obtaining a data compensation value corresponding to each sub-pixel according to the polarity input signal and a position of each sub-pixel of the current data frame; under the second polarity mode, after superimposing a value of each sub-pixel of the current data frame and the data compensation value corresponding to each sub-pixel, outputting to a display panel; and if the current data frame does not satisfy a preset switching condition, under the first polarity mode, outputting the value of each sub-pixel of the current data frame to the display panel; wherein, the step of detecting that if a current data frame satisfies a preset switching condition of switching a first polarity mode to a second polarity mode includes: obtaining the number of the sub-pixels that have a same gray level value in the current data frame; determining that if the number of the sub-pixels that have the same gray level value is greater than a preset value; and if the number of the sub-pixels that have the same gray level value is greater than a preset value, the current data frame satisfies the preset condition.

Wherein, the step of obtaining a data compensation value corresponding to each sub-pixel according to the polarity input signal and a position of each sub-pixel of the current data frame comprise: when the sub-pixel of the current data frame is located at a first position, in the previous data frame and the current data frame, respectively obtaining gray level values corresponding to sub-pixels at the first positions, and respectively denoting as an original gray level value and a current gray level value; according to the original gray level value and the current gray level value, obtaining the data compensation value in a data compensation table corresponding to the polarity input signal using a bilinear interpolation method; and wherein, the first position is a position corresponding to the sub-pixel having a same polarity when switching from the first polarity mode to the second polarity mode.

Wherein, the step of obtaining a data compensation value corresponding to each sub-pixel according to the polarity input signal and a position of each sub-pixel of the current data frame further includes: when the sub-pixel in the current data frame is located at a second position, the data compensation value corresponding to the sub-pixel located at the second position is zero; wherein, the second position is a position corresponding to the sub-pixel having different polarities when switching from the first polarity mode to the second polarity mode.

Wherein, when the polarity input signal is the first polarity signal, under the first polarity mode, the polarities of the sub-pixels are repeatedly arranged by positive, negative, negative, positive along rows and columns of a data frame; when the polarity input signal is the second polarity signal, under the first polarity mode, the polarities of the sub-pixels are repeatedly arranged by negative, positive, positive, negative along rows and columns of a data frame; and when the first polarity mode is switched to the second polarity mode, under the second polarity mode, the polarities of the sub-pixels are repeatedly arranged by positive, negative along rows and columns of a data frame.

In order to solve the above technology problem, another technology solution adopted by the present invention is: a driving method for a display panel, comprising: detecting that if a current data frame satisfies a preset switching condition of switching a first polarity mode to a second polarity mode; if the current data frame satisfies a preset switching condition, obtaining a polarity input signal corresponding to a previous data frame; and obtaining a data compensation value corresponding to each sub-pixel according to the polarity input signal and a position of each sub-pixel of the current data frame; under the second polarity mode, after superimposing a value of each sub-pixel of the current data frame and the data compensation value corresponding to each sub-pixel, outputting to a display panel.

Wherein, the step of detecting that if a current data frame satisfies a preset switching condition of switching a first polarity mode to a second polarity mode includes: obtaining the number of the sub-pixels that have a same gray level value in the current data frame; determining that if the number of the sub-pixels that have the same gray level value is greater than a preset value; and if the number of the sub-pixels that have the same gray level value is greater than a preset value, the current data frame satisfies the preset condition.

Wherein, the step of obtaining a data compensation value corresponding to each sub-pixel according to the polarity input signal and a position of each sub-pixel of the current data frame comprise: when the sub-pixel of the current data frame is located at a first position, in the previous data frame and the current data frame, respectively obtaining gray level values corresponding to sub-pixels at the first positions, and respectively denoting as an original gray level value and a current gray level value; according to the original gray level value and the current gray level value, obtaining the data compensation value in a data compensation table corresponding to the polarity input signal using a bilinear interpolation method; and wherein, the first position is a position corresponding to the sub-pixel having a same polarity when switching from the first polarity mode to the second polarity mode.

Wherein, the step of obtaining a data compensation value corresponding to each sub-pixel according to the polarity input signal and a position of each sub-pixel of the current data frame further includes: when the sub-pixel in the current data frame is located at a second position, the data compensation value corresponding to the sub-pixel located at the second position is zero; wherein, the second position is a position corresponding to the sub-pixel having different polarities when switching from the first polarity mode to the second polarity mode.

Wherein, when the polarity input signal is the first polarity signal, under the first polarity mode, the polarities of the sub-pixels are repeatedly arranged by positive, negative, negative, positive along rows and columns of a data frame; when the polarity input signal is the second polarity signal, under the first polarity mode, the polarities of the sub-pixels are repeatedly arranged by negative, positive, positive, negative along rows and columns of a data frame; and when the first polarity mode is switched to the second polarity mode, under the second polarity mode, the polarities of the sub-pixels are repeatedly arranged by positive, negative along rows and columns of a data frame.

Wherein, if the current data frame does not satisfy a preset switching condition, under the first polarity mode, outputting the value of each sub-pixel of the current data frame to the display panel.

In order to solve the above technology problem, another technology solution adopted by the present invention is: a driving device for a display panel, comprising:

a detection module, used for detecting that if a current data frame satisfies a preset switching condition of switching a first polarity mode to a second polarity mode, wherein, when the current data frame satisfies a preset switching condition, generating a compensation enable signal;

a compensation selection signal generation module connected with the detection module, and used for generating a compensation selection signal according to the compensation enable signal generated by the detection module, a polarity input signal corresponding to a previous data frame and a position of each sub-pixel of a current data frame;

a compensation value obtaining module connected with the compensation selection signal generation module, and used for obtaining a data compensation value corresponding to each sub-pixel under a control of the compensation selection signal generated by the compensation selection signal generation module; and an output module connected with the compensation value obtaining module, and used for under the second polarity mode, after superimposing a value of each sub-pixel of the current data frame and the data compensation value corresponding to each sub-pixel, outputting to a display panel.

Wherein, the compensation value obtaining module includes a first compensation unit, a second compensation unit and a third compensation unit;

when the polarity input signal is a first polarity signal and the sub-pixel in the current data frame is located at a first position, the compensation selection signal selects the first compensation unit to obtain a data compensation value corresponding to the sub-pixel located at the first position in the current data frame;

when the polarity input signal is a second polarity signal and the sub-pixel in the current data frame is located at a first position, the compensation selection signal selects the second compensation unit to obtain a data compensation value corresponding to the sub-pixel located at the first position in the current data frame; and when the polarity input signal is the first polarity signal or the second polarity signal and the sub-pixel in the current data frame is located at a second position, the compensation selection signal selects the third compensation unit to obtain a data compensation value corresponding to the sub-pixel located at the second position in the current data frame;

wherein, the first position is a position corresponding to the sub-pixel having a same polarity when switching from the first polarity mode to the second polarity mode, and the second position is a position corresponding to the sub-pixel having different polarities when switching from the first polarity mode to the second polarity mode.

Wherein, the first compensation unit and the second compensation unit are respectively used for in the previous data frame and the current data frame, respectively obtaining gray level values corresponding to sub-pixels at the first positions, and respectively denoting as an original gray level value and a current gray level value; according to the original gray level value and the current gray level value, obtaining the data compensation value in a data compensation table corresponding to the polarity input signal using a bilinear interpolation method.

Wherein, the third compensation unit is a pass-through unit, the data compensation value corresponding to the sub-pixel located in the second position in the current data frame obtained by the third compensation unit is zero.

The beneficial effect of the present invention is: in the driving method for a display panel and the driving device, through detecting that if a current data frame satisfies a preset switching condition of switching a first polarity mode to a second polarity mode; if the current data frame satisfies a preset switching condition, obtaining a polarity input signal corresponding to a previous data frame; obtaining a data compensation value corresponding to each sub-pixel according to the polarity input signal and a position of each sub-pixel of the current data frame; under the second polarity mode, after superimposing a value of each sub-pixel of the current data frame and the data compensation value corresponding to each sub-pixel, outputting to a display panel. Accordingly, the present invention can avoid an instantaneous flicker when switching from the first polarity mode to the second polarity mode.

DETAILED DESCRIPTION OF THE PREFERRED EMBODIMENT

In the embodiment and claims of the present invention, some vocabularies are used to indicate some specific elements. A person skilled in the art can understand that manufacturers may use a different vocabulary to indicate a same element. The present embodiment and claims do not use the difference in the vocabularies to distinguish the elements. The present embodiment and claims utilize the difference in the functions of the elements to distinguish the elements. The following content combines with the drawings and the embodiment for describing the present invention in detail.

Figure 1:
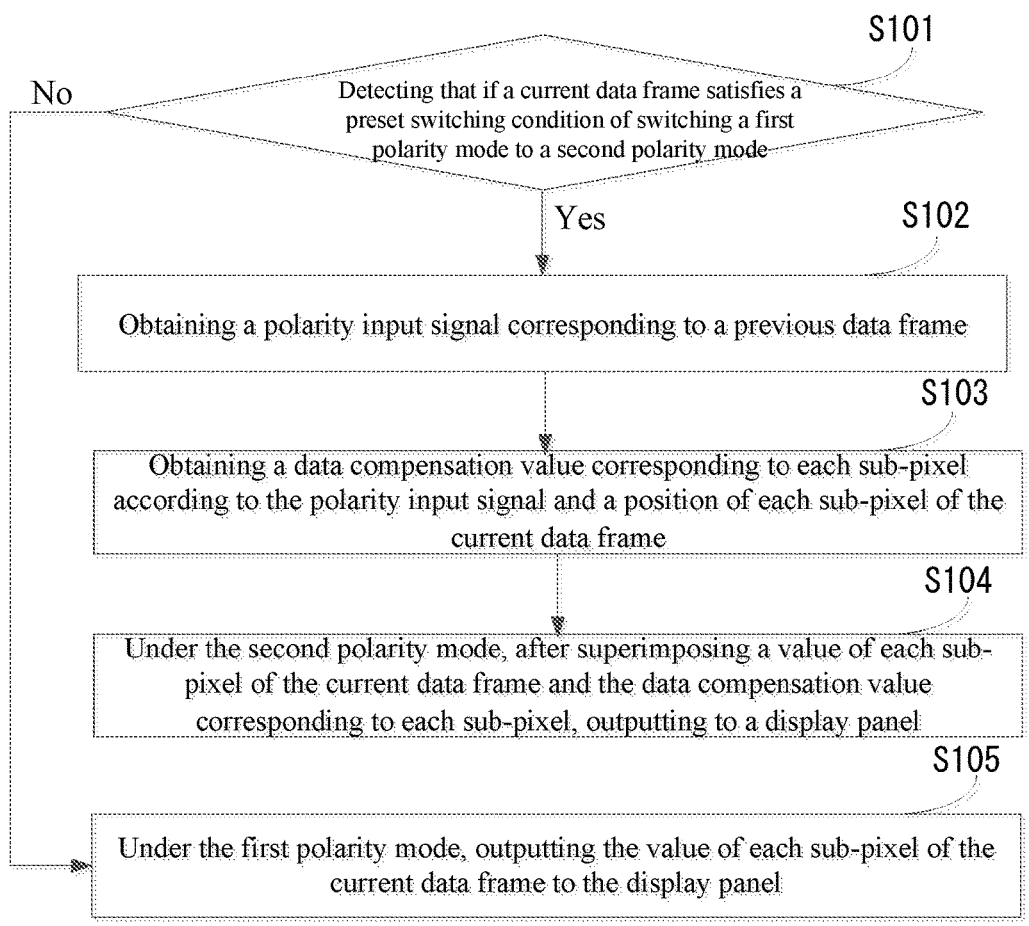
FIG. 1 is a flow chart of a driving method for a display panel of an embodiment of the present invention.

FIG. 1 is a flow chart of a driving method for a display panel of an embodiment of the present invention. It should be noted that if an essentially same result is existed, the method of the present invention is not limited to the sequence shown in FIG. 1. As shown in FIG. 1, the method comprises following steps:

Step S101: detecting that if a current data frame satisfies a preset switching condition of switching a first polarity mode to a second polarity mode. If the condition is satisfied, executing step S102, otherwise, executing a step S105.

In the step S101, the step of detecting that if a current data frame satisfies a preset condition of switching a first polarity mode to a second polarity mode includes: obtaining the number of sub-pixels that have a same gray level value in the current data frame; determining that if the number of sub-pixels that have the same gray level value is greater than a preset value; if the number of sub-pixels that have the same gray level value is greater than the preset value, determining that the current data frame satisfies the preset switching condition.

From another point of view, when the number of the sub-pixels that have a same gray level value is greater than a preset value, that is, when the displayed picture of the current data frame is under a low gray level, in order to avoid the H-block problem, switching the current data frame from the first polarity mode to the second polarity mode.

Step S102: obtaining a polarity input signal corresponding to a previous data frame.

In the step S102, the polarity input signal corresponding to the previous data frame includes a first polarity signal and a second polarity signal. Wherein, the polarity input signal is switched back and forth between the first polarity signal and the second polarity signal according to the change of the data frames. For example, when a first data frame corresponds to a first polarity signal, a second data frame corresponds to a second polarity signal, a third data frame corresponds to the first polarity signal, and a fourth data frame corresponds to the second polarity signal . . . cycled sequentially.

Step S103: obtaining a data compensation value corresponding to each sub-pixel according to the polarity input signal and a position of each sub-pixel of the current data frame.

In the step S103, when the sub-pixel of the current data frame is located at a first position, the step of obtaining a data compensation value of each sub-pixel according to the polarity input signal and a position of each sub-pixel of the current data frame specifically is: in the previous data frame and the current data frame, respectively obtaining gray level values corresponding to sub-pixels at the first positions, and respectively denoting as an original gray level value and a current gray level value; according to the original gray level value and the current gray level value, obtaining the data compensation value in a data compensation table corresponding to the polarity input signal using a bilinear interpolation method.

Wherein, the step of according to the original gray level value and the current gray level value, obtaining the data compensation value in a data compensation table corresponding to the polarity input signal using a bilinear interpolation method specifically is: obtaining a data compensation table corresponding to the polarity input signal; obtaining a first original gray level value and a second original gray level value adjacent to the original gray level value, and a first current gray level value and a second current gray level value adjacent to the current gray level value in the data compensation table. Wherein, the first original gray level value is less than the second original gray level value the first current gray level value is less than the second current gray level value; obtaining a first data compensation value corresponding to the first original gray level value and the first current gray level value, a second data compensation value corresponding to the first original gray level value and the second current gray level value, a third data compensation value corresponding to the second original gray level value and the first current gray level value, and a fourth data compensation value corresponding to the second original gray level value and the second current gray level value; according to the first original gray level value, the second original gray level value, the first current gray level value, the second current gray level value, the first data compensation value, the second data compensation value, the third data compensation value, the fourth data compensation value, obtaining the data compensation value corresponding to the original gray level value and the current gray level value.

Wherein, the first position is a position corresponding to the sub-pixel having a same polarity when switching from the first polarity mode to the second polarity mode.

Figure 2:
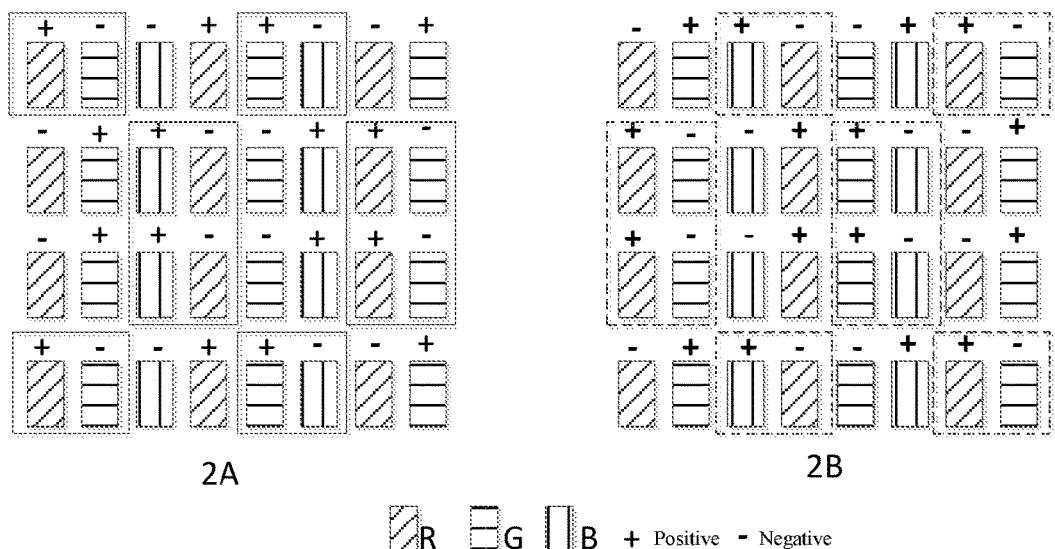
FIG. 2 is a schematic diagram of the polarity of each sub-pixel under a first polarity mode.
Figure 3:
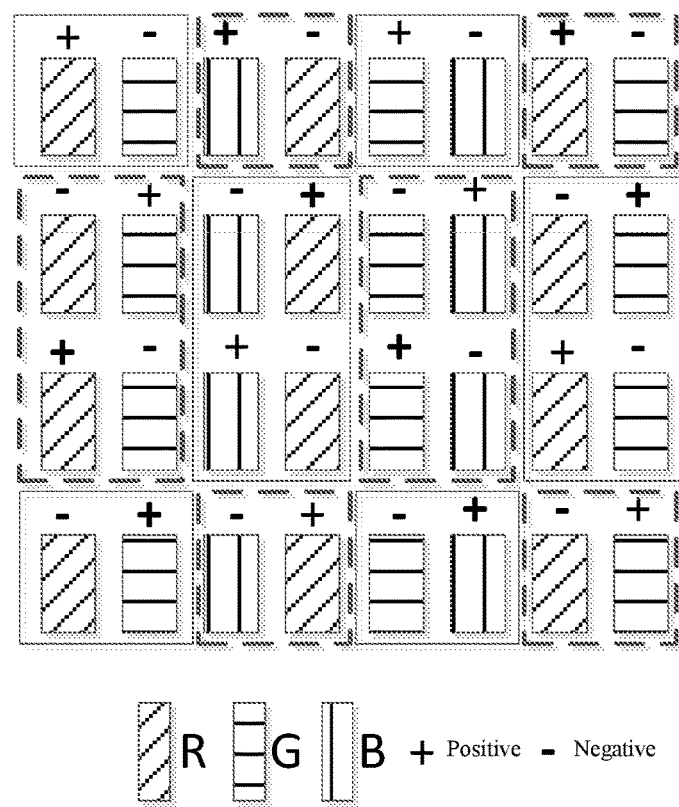
FIG. 3 is a schematic diagram of the polarity of each sub-pixel when switching from the first polarity mode to the second polarity mode.

With further reference to FIG. 2 and FIG. 3, and FIG. 2 is a schematic diagram of the polarity of each sub-pixel under the first polarity mode. FIG. 3 is a schematic diagram of the polarity of each sub-pixel when switching from the first polarity mode to the second polarity mode.

Wherein, when the polarity input signal is the first polarity signal, under the first polarity mode, as shown in FIG. 2A, the polarities of the sub-pixels are repeatedly arranged by positive, negative, negative, positive (+, −, −, +) along rows and columns of a data frame. When the polarity input signal is the second polarity signal, under the first polarity mode, as shown in FIG. 2B, the polarities of the sub-pixels are repeatedly arranged by negative, positive, positive, negative (−, +, +, −) along rows and columns of a data frame. That is, under the first polarity signal and the second polarity signal, the polarities of the sub-pixels under the first polarity mode are right opposite.

Wherein, when the first polarity mode is switched to the second polarity mode, as shown in FIG. 3, under the second polarity mode, the polarities of the sub-pixels are repeatedly arranged by positive, negative (+, −) along rows and columns of a data frame.

The person skilled in the art can understood that when the first polarity mode is switched to the second polarity mode, that may switch from FIG. 2A to FIG. 3 or switch from FIG. 2B to FIG. 3. Two different switching ways are existed, and is specifically determined by the polarity input signal.

Using switching from FIG. 2A to FIG. 3 as an example, the first position is a position corresponding to the sub-pixels in the solid boxes in FIG. 2A and FIG. 3. Using switching from FIG. 2B to FIG. 3 as an example, the first position is a position corresponding to the sub-pixels in the dashed boxes in FIG. 2B and FIG. 3.

Because at the first position, when switching from the first polarity mode to the second polarity mode, the polarities of the sub-pixels are the same, the data compensation value corresponding to the sub-pixels is required in order to improve the gray level value corresponding to that kind of the sub-pixels so as to solve the instantaneous flicker problem.

Specifically, using a sub-pixel A in the first position as an example, obtaining the data compensation value corresponding to the sub-pixel A specifically is: respectively obtaining gray level values corresponding to the sub-pixel A in the previous data frame and the current data frame, and denoting as an original gray level value x and a current gray level value y.

Obtaining the data compensation table corresponding to the polarity input signal, wherein, the data compensation table is specifically as following:

| Current gray level value | | | | | | | | | | | | | | | | | |
|---|---|---|---|---|---|---|---|---|---|---|---|---|---|---|---|---|---|
| 256 | 0 | 0 | 0 | 0 | 0 | 0 | 0 | 0 | 0 | 0 | 0 | 0 | 0 | 0 | 0 | 0 | 0 |
| 240 | 14 | 14 | 14 | 14 | 14 | 14 | 14 | 14 | 14 | 14 | 14 | 14 | 10 | 8 | 4 | 0 | −8 |
| 224 | 30 | 30 | 30 | 30 | 30 | 30 | 30 | 28 | 24 | 22 | 18 | 14 | 10 | 6 | 0 | −4 | −6 |
| 208 | 46 | 46 | 44 | 42 | 40 | 36 | 34 | 30 | 26 | 22 | 18 | 12 | 6 | 0 | −4 | −8 | −12 |
| 192 | 58 | 52 | 50 | 46 | 44 | 40 | 36 | 32 | 28 | 22 | 16 | 10 | 0 | −4 | −8 | −12 | −16 |
| 176 | 60 | 54 | 50 | 46 | 40 | 36 | 32 | 26 | 20 | 14 | 8 | 0 | −6 | −12 | −20 | −28 | −34 |
| 160 | 66 | 56 | 50 | 44 | 36 | 30 | 26 | 20 | 16 | 10 | 0 | −8 | −20 | −30 | −40 | −50 | −60 |
| 144 | 74 | 60 | 52 | 44 | 36 | 30 | 24 | 18 | 10 | 0 | −10 | −22 | −36 | −46 | −56 | −66 | −76 |
| 128 | 82 | 66 | 58 | 48 | 40 | 32 | 22 | 14 | 0 | −8 | −20 | −32 | −46 | −56 | −66 | −74 | −80 |
| 112 | 92 | 74 | 64 | 52 | 40 | 28 | 14 | 0 | −10 | −18 | −30 | −42 | −54 | −64 | −74 | −84 | −94 |
| 96 | 100 | 80 | 68 | 52 | 32 | 16 | 0 | −10 | −20 | −30 | −40 | −54 | −68 | −80 | −86 | −90 | −94 |
| 80 | 108 | 82 | 66 | 42 | 20 | 0 | −14 | −24 | −36 | −46 | −62 | −72 | −76 | −78 | −78 | −80 | −80 |
| 64 | 114 | 80 | 54 | 26 | 0 | −18 | −38 | −52 | −58 | −60 | −62 | −62 | −64 | −64 | −64 | −64 | −64 |
| 48 | 114 | 60 | 30 | 0 | −38 | −44 | −46 | −46 | −48 | −48 | −48 | −48 | −48 | −48 | −48 | −48 | −48 |
| 32 | 100 | 32 | 0 | −28 | −30 | −32 | −32 | −32 | −32 | −32 | −32 | −32 | −32 | −32 | −32 | −32 | −32 |
| 16 | 60 | 0 | −14 | −16 | −16 | −16 | −16 | −16 | −16 | −16 | −16 | −16 | −16 | −16 | −16 | −16 | −16 |
| 0 | 0 | −1 | −1 | −1 | −1 | −1 | −1 | −1 | 1 | −1 | −1 | −1 | −1 | −1 | −1 | −1 | −1 |
| | 0 | 16 | 32 | 48 | 64 | 80 | 96 | 112 | 128 | 144 | 160 | 176 | 192 | 208 | 224 | 240 | 256 |
| | Original gray level value | | | | | | | | | | | | | | | | | |

Wherein, a horizontal axis of the table represents an original gray level value, and a vertical axis of the table represents a current gray level value. The content in the table is the data compensation value corresponding to the original gray level value and the current gray level value. The person skilled in the art can understood that the content of the data compensation table is only an example, the present invention is not limited.

In the present embodiment, when the polarity input signal is the first polarity signal, using a first data compensation table. When the polarity input signal is a second polarity signal, using the second data compensation table. The arrangements of the first compensation table and the second compensation table are the same as the arrangement of the above data compensation table. The contents of the first data compensation table and the second data compensation table are different. From another point of view, the first data compensation table corresponding to a switching mode that is switched from FIG. 2A to FIG. 3, and the second data compensation table corresponds to a switching mode that is switched from FIG. 2B to FIG. 3.

Obtaining a first original gray level value x1 and a second original gray level value x2 adjacent to the original gray level value x in the data compensation table. Assuming that the original gray level value x is 76, then, the first original gray level value x1 is 64, and the second original gray level value x2 is 80. Obtaining a first current gray level value y1 and a second current gray level value y2 adjacent to the current gray level value y in the data compensation table. Assuming that the current gray level value y is 115, then, the first current gray level value y1 is 112, and the second current gray level value y2 is 128. Obtaining a first data compensation value Q11 corresponding to the first original gray level value x1 and the first current gray level value y1, the second data compensation value Q12 corresponding to the first original gray level value x1 and the second current gray level value y2, the third data compensation value Q21 corresponding to the second original gray level value x2 and the first current gray level value y1, the fourth data compensation value Q22 corresponding to the second original gray level value x2 and the second current gray level value y2. Wherein, the first data compensation value Q11, the second data compensation value Q12, the third data compensation value Q21 and the fourth data compensation value Q22 are respectively 40, 40, 28 and 32.

Figure 4:
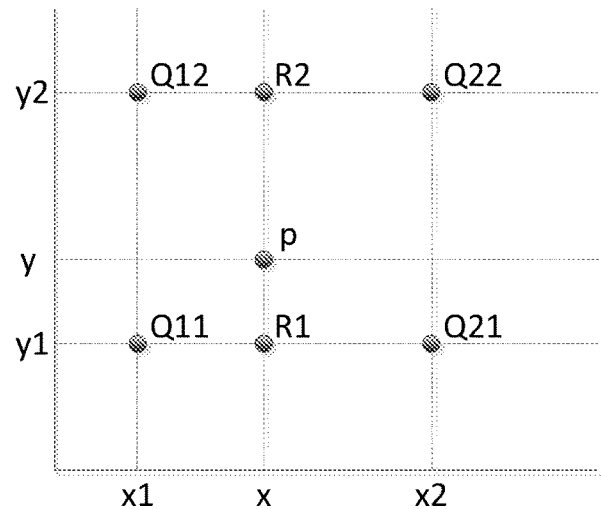
FIG. 4 is a schematic diagram of a bilinear interpolation method.

With reference to FIG. 4, and FIG. 4 is a schematic diagram of a bilinear interpolation method. As shown in FIG. 4, in order to calculate the data compensation value, that is the value of P, corresponding to the original gray level value x and the current gray level value y, performing a linear interpolation in a X direction to calculate values of R1 and R2. Then, performing a linear interpolation in a Y direction to calculate the value of P by the values of R1 and R2.

Specifically, R1 is calculated according to a following formula:

$$R1 \approx \frac{X2 - X}{X2 - X1} Q11 + \frac{X - X1}{X2 - X1} Q21$$

Substituting the original gray level value x, the first original gray level value x1, the second original gray level value x2, the first data compensation value Q11, the third data compensation value Q21 into the above formula, the value of R1 is obtained. That is, the data compensation value corresponding to the original gray level value x and the first current gray level value y1.

Following as described above, $$R1 \approx \frac{80 - 76}{80 - 64} * 40 + \frac{76 - 64}{80 - 64} * 28 \approx 31$$

Specifically, R2 is calculated according to following formula:

$$R2 \approx \frac{X2 - X}{X2 - X1} Q12 + \frac{X - X1}{X2 - X1} Q22$$

Substituting the original gray level value x, the first original gray level value x1, the second original gray level value x2, the second data compensation value Q12, the fourth data compensation value Q22 into the above formula, the value of R2 is obtained. That is, the data compensation value corresponding to the original gray level value x and the second current gray level value y2.

Following as described above, $$R2 \approx \frac{80-76}{80-64}*40 + \frac{76-64}{80-64}*32 \approx 34$$

Specifically, P is calculated according to following formula:

$$P \approx \frac{y2-y}{y2-y1}R1 + \frac{y-y1}{y2-y1}R2$$

Substituting the current gray level value y, the first current gray level value y1, the second current gray level value y2, the value of R1, the value of R2 into the above formula, the value of P is obtained. That is, the data compensation value corresponding to the original gray level value x and the current gray level value y.

As described above, $$p \approx \frac{128-115}{128-112}*31 + \frac{115-112}{128-112}*34 \approx 31.5,$$

that is, the data compensation value corresponding to the sub-pixel A is 31.5.

In the present embodiment, when the sub-pixel in the current data frame is located at a second position, the data compensation value corresponding to the sub-pixel located at the second position is zero. Wherein, the second position is a position corresponding to the sub-pixel having different polarities when switching from the first polarity mode to the second polarity mode. From another point of view, because at the second position, when switching from the first polarity mode to the second polarity mode, the polarity of the sub-pixel is different, a compensation is not required to the sub-pixel.

Step S104: under the second polarity mode, after superimposing a value of each sub-pixel of the current data frame and the data compensation value corresponding to each sub-pixel, outputting to a display panel.

In the step S104, under the second polarity mode, after superimposing a value of each sub-pixel at the first position of the current data frame and the data compensation value corresponding to each sub-pixel to obtain superimposed values, outputting the superimposed values to a display panel. Wherein, the superimposing can be an adding of the current gray level value and the corresponding data compensation value, or a subtracting of the current gray level value and the corresponding data compensation value, determined according to an actual situation. Directly outputting current gray level values of the sub-pixels located at a second position to the display panel.

The person skilled in the art can understood that after the current data frame finished displaying, a next data frame does not require performing a data compensation, but directly outputting to the display panel. Besides, the polarities of the sub-pixels in the next data frame are opposite to the polarities of the sub-pixels shown in FIG. 3.

Step S105: under the first polarity mode, outputting the value of each sub-pixel of the current data frame to the display panel.

In the step S105, wherein the current data frame detected in the step S101 does not satisfy a preset switching condition of switching the first polarity mode to the second polarity mode, under the first polarity mode-, outputting the value of each sub-pixel of the current data frame to the display panel.

Wherein, if the polarity input signal of the previous data frame is the first polarity signal, the polarities of the sub-pixels in the current data frame is as shown in FIG. 2B. If the polarity input signal of the previous data frame is the second polarity signal, the polarities of the sub-pixels in the current data frame is as shown in FIG. 2A.

Figure 5:
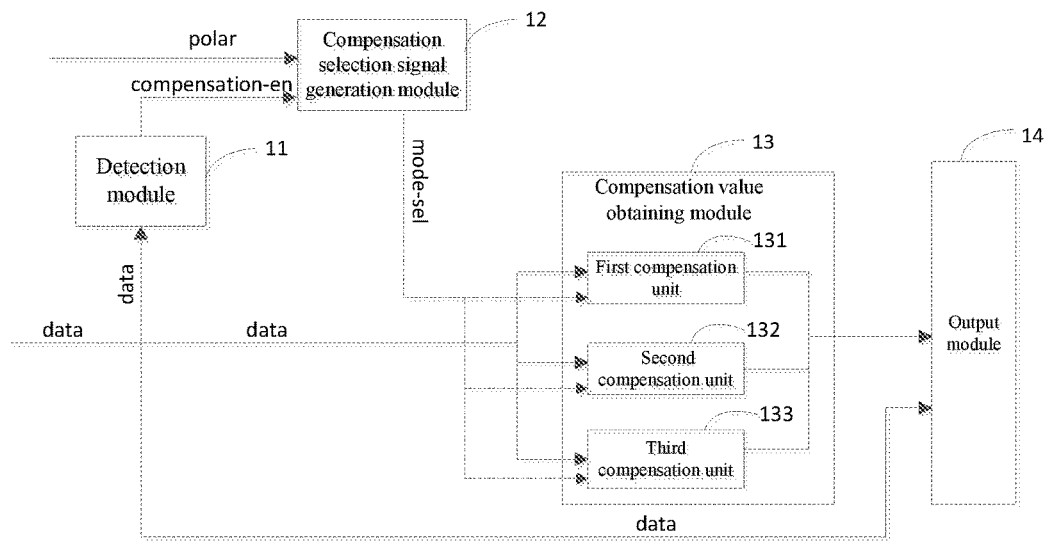
FIG. 5 is a schematic diagram of a driving device for a display panel of an embodiment of the present invention.

FIG. 5 is a schematic diagram of a driving device for a display panel of an embodiment of the present invention. As shown in FIG. 5, the driving device includes a detection module 11, a compensation selection signal generation module 12, a compensation value obtaining module 13 and an output module 14.

The detection module 11 is used for detecting that if a current data frame (data) satisfies a preset switching condition of switching a first polarity mode to a second polarity mode, wherein, when the current data frame satisfies a preset switching condition, generating a compensation enable signal (composation-en).

The compensation selection signal generation module 12 is connected with the detection module 11, and used for generating a compensation selection signal (mode-sel) according to the compensation enable signal (composation-en) generated by the detection module 11, a polarity input signal (polar) corresponding to a previous data frame and a position of each sub-pixel of a current data frame.

The compensation value obtaining module 13 is connected with the compensation selection signal generation module 12, and used for obtaining a data compensation value corresponding to each sub-pixel under a control of the compensation selection signal (mode-sel) generated by the compensation selection signal generation module 12.

Wherein, the compensation value obtaining module 13 includes a first compensation unit 131, a second compensation unit 132 and a third compensation unit 133. When the polarity input signal is a first polarity signal and the sub-pixel in the current data frame is located at a first position, the compensation selection signal (mode-sel) selects the first compensation unit 131 to obtain a data compensation value corresponding to the sub-pixel located at the first position in the current data frame; when the polarity input signal is a second polarity signal and the sub-pixel in the current data frame is located at a first position, the compensation selection signal (mode-sel) selects the second compensation unit 132 to obtain a data compensation value corresponding to the sub-pixel located at the first position in the current data frame; when the polarity input signal is the first polarity signal or the second polarity signal and the sub-pixel in the current data frame is located at a second position, the compensation selection signal (mode-sel) selects the third compensation unit 133 to obtain a data compensation value corresponding to the sub-pixel located at the second position in the current data frame. Wherein, the first position is a position corresponding to the sub-pixel having a same polarity when switching from the first polarity mode to the second polarity mode, and the second position is a position corresponding to the sub-pixel having different polarities when switching from the first polarity mode to the second polarity mode.

Specifically, the first compensation unit 131 and the second compensation unit 132 are respectively used for in the previous data frame and the current data frame, respectively obtaining gray level values corresponding to sub-pixels at the first positions, and respectively denoting as an original gray level value and a current gray level value; according to the original gray level value and the current gray level value, obtaining the data compensation value in a data compensation table corresponding to the polarity input signal using a bilinear interpolation method.

Wherein, when the polarity input signal is the first polarity signal, the data compensation table is a first data compensation table, and the first data compensation table is disposed inside the first compensation unit 131. When the polarity input signal is a second polarity signal, the data compensation table is a second data compensation table, and the second data compensation table is disposed inside the second compensation unit 132.

The third compensation unit 133 is a pass-through unit, the data compensation value corresponding to the sub-pixel located in the second position in the current data frame obtained by the third compensation unit 133 is zero.

The output module is connected with the compensation value obtaining module 13, and used for under the second polarity mode, after superimposing a value of each sub-pixel of the current data frame and the data compensation value corresponding to each sub-pixel, outputting to a display panel and under the first polarity mode, outputting the value of each sub-pixel of the current data frame to the display panel.

The beneficial effect of the present invention is: in the driving method for a display panel and the driving device, through detecting that if a current data frame satisfies a preset switching condition of switching a first polarity mode to a second polarity mode; if the current data frame satisfies a preset switching condition, obtaining a polarity input signal corresponding to a previous data frame; obtaining a data compensation value corresponding to each sub-pixel according to the polarity input signal and a position of each sub-pixel of the current data frame; under the second polarity mode, after superimposing a value of each sub-pixel of the current data frame and the data compensation value corresponding to each sub-pixel, outputting to a display panel. Accordingly, the present invention can avoid an instantaneous flicker when switching from the first polarity mode to the second polarity mode.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A driving method for a display panel, comprising:
   detecting that if a current data frame satisfies a preset switching condition of switching a first polarity mode to a second polarity mode;
   if the current data frame satisfies a preset switching condition, obtaining a polarity input signal corresponding to a previous data frame;
   obtaining a data compensation value corresponding to each sub-pixel according to the polarity input signal and a position of each sub-pixel of the current data frame;
   under the second polarity mode, after superimposing a value of each sub-pixel of the current data frame and the data compensation value corresponding to each sub-pixel, outputting to a display panel; and
   if the current data frame does not satisfy a preset switching condition, under the first polarity mode, outputting the value of each sub-pixel of the current data frame to the display panel;
   wherein, the step of detecting that if a current data frame satisfies a preset switching condition of switching a first polarity mode to a second polarity mode includes
   obtaining the number of the sub-pixels that have a same gray level value in the current data frame;
   determining that if the number of the sub-pixels that have the same gray level value is greater than a preset value; and
   if the number of the sub-pixels that have the same gray level value is greater than a preset value, the current data frame satisfies the preset condition;
   wherein, the step of obtaining a data compensation value corresponding to each sub-pixel according to the polarity input signal and a position of each sub-pixel of the current data frame comprises:
   when the sub-pixel of the current data frame is located at a first position, in the previous data frame and the current data frame, respectively obtaining gray level values corresponding to sub-pixels at the first positions, and respectively denoting as an original gray level value and a current gray level value; according to the original gray level value and the current gray level value, obtaining the data compensation value in a data compensation table corresponding to the polarity input signal using a bilinear interpolation method; and
   wherein, the first position is a position corresponding to the sub-pixel having a same polarity when switching from the first polarity mode to the second polarity mode.

2. The method according to claim 1, wherein, the step of obtaining a data compensation value corresponding to each sub-pixel according to the polarity input signal and a position of each sub-pixel of the current data frame further includes:
   when the sub-pixel in the current data frame is located at a second position, the data compensation value corresponding to the sub-pixel located at the second position is zero;
   wherein, the second position is a position corresponding to the sub-pixel having different polarities when switching from the first polarity mode to the second polarity mode.

3. The method according to claim 1, wherein, when the polarity input signal is the first polarity signal, under the first polarity mode, the polarities of the sub-pixels are repeatedly arranged by positive, negative, negative, positive along rows and columns of a data frame;
   when the polarity input signal is the second polarity signal, under the first polarity mode, the polarities of the sub-pixels are repeatedly arranged by negative, positive, positive, negative along rows and columns of a data frame; and
   when the first polarity mode is switched to the second polarity mode, under the second polarity mode, the polarities of the sub-pixels are repeatedly arranged by positive, negative along rows and columns of a data frame.

4. A driving method for a display panel, comprising:

detecting that if a current data frame satisfies a preset switching condition of switching a first polarity mode to a second polarity mode;

if the current data frame satisfies a preset switching condition, obtaining a polarity input signal corresponding to a previous data frame; and obtaining a data compensation value corresponding to each sub-pixel according to the polarity input signal and a position of each sub-pixel of the current data frame;

under the second polarity mode, after superimposing a value of each sub-pixel of the current data frame and the data compensation value corresponding to each sub-pixel, outputting to a display panel;

wherein, the step of obtaining a data compensation value corresponding to each sub-pixel according to the polarity input signal and a position of each sub-pixel of the current data frame comprises:

when the sub-pixel of the current data frame is located at a first position, in the previous data frame and the current data frame, respectively obtaining gray level values corresponding to sub-pixels at the first positions, and respectively denoting as an original gray level value and a current gray level value; according to the original gray level value and the current gray level value, obtaining the data compensation value in a data compensation table corresponding to the polarity input signal using a bilinear interpolation method; and wherein, the first position is a position corresponding to the sub-pixel having a same polarity when switching from the first polarity mode to the second polarity mode.

5. The according to claim 4, wherein, the step of detecting that if a current data frame satisfies a preset switching condition of switching a first polarity mode to a second polarity mode includes:

obtaining the number of the sub-pixels that have a same gray level value in the current data frame;

determining that if the number of the sub-pixels that have the same gray level value is greater than a preset value; and if the number of the sub-pixels that have the same gray level value is greater than a preset value, the current data frame satisfies the preset condition.

6. The method according to claim 4, wherein, the step of obtaining a data compensation value corresponding to each sub-pixel according to the polarity input signal and a position of each sub-pixel of the current data frame further includes:

when the sub-pixel in the current data frame is located at a second position, the data compensation value corresponding to the sub-pixel located at the second position is zero;

wherein, the second position is a position corresponding to the sub-pixel having different polarities when switching from the first polarity mode to the second polarity mode.

7. The method according to claim 4, wherein, when the polarity input signal is the first polarity signal, under the first polarity mode, the polarities of the sub-pixels are repeatedly arranged by positive, negative, negative, positive along rows and columns of a data frame;

when the polarity input signal is the second polarity signal, under the first polarity mode, the polarities of the sub-pixels are repeatedly arranged by negative, positive, positive, negative along rows and columns of a data frame; and when the first polarity mode is switched to the second polarity mode, under the second polarity mode, the polarities of the sub-pixels are repeatedly arranged by positive, negative along rows and columns of a data frame.

8. The method according to claim 4, wherein, if the current data frame does not satisfy a preset switching condition, under the first polarity mode, outputting the value of each sub-pixel of the current data frame to the display panel.

* * * * *